(No Model.)
E. PROUTY.
CAR BRAKE.
No. 547,965. Patented Oct. 15, 1895.
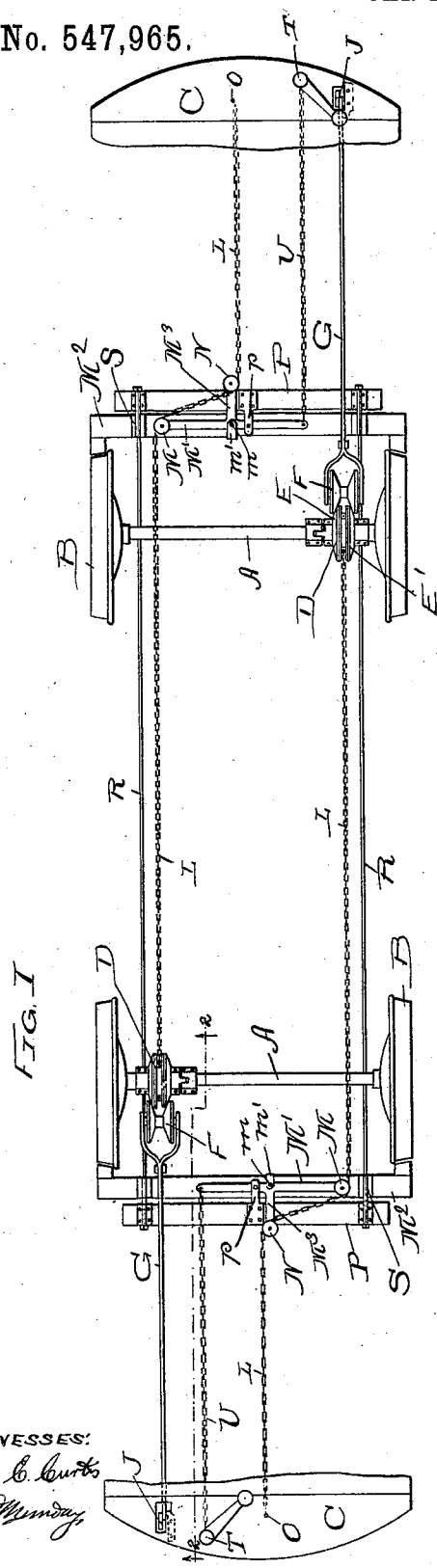
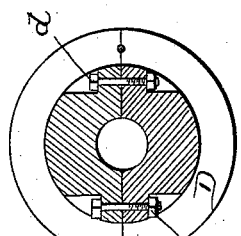
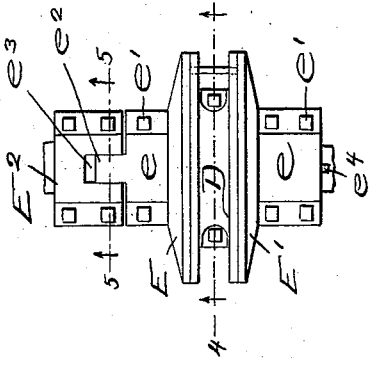
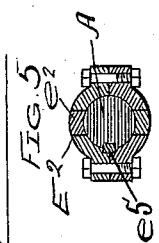
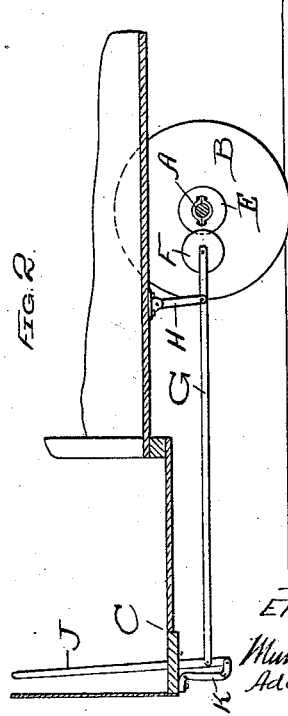
WITNESSES:
Geo. E. Curtis
H. M. Munday
INVENTOR:
ENOCH PROUTY
BY
Munday, Evarts &
Adcock
HIS ATT'YS.

UNITED STATES PATENT OFFICE.

ENOCH PROUTY, OF CHICAGO, ILLINOIS.

CAR-BRAKE.

SPECIFICATION forming part of Letters Patent No. 547,965, dated October 15, 1895.

Application filed July 26, 1895. Serial No. 557,194. (No model.)

*To all whom it may concern:*

Be it known that I, ENOCH PROUTY, a citizen of the United States, residing in Chicago, in the county of Cook and State of Illinois, have invented a new and useful Improvement in Car-Brakes, of which the following is a specification.

This invention relates to the construction of brakes for street-railway, electric, or other cars.

The principal feature of the invention is found in the construction of a friction-clutch whereby the chain which actuates the brake-shoe bars or levers may be wound upon the axle and thus caused to force the brake-shoes against the wheel.

The nature of the invention will be fully understood from the accompanying drawings and the following description thereof.

In said drawings, Figure 1 is a plan of a car to which my invention has been applied, the body and floor of the car being mainly cut away, so as to expose the running-gear and brake mechanism. Fig. 2 is a partial vertical section on the line 2 2 of Fig. 1. Fig. 3 is an enlarged plan of a portion of the clutch mechanism, and Fig. 4 is a section of Fig. 3 on the line 4 4. Fig. 5 is a section on the line 5 5 of Fig. 3.

In said drawings, A A represent the axles, B B the wheels, and C C the platforms, of the car. Each axle is preferably provided with my improved clutch mechanism; but the clutch mechanism may be used on only one of them, if preferred. This clutch mechanism consists of a chain-winding reel D, loose upon the axle, two friction-disks E and E', the disk E' being rigid upon the axle and the disk E being keyed to the axle, so as to rotate therewith, but also capable of a sliding motion thereon, and a rotatable spool F, adapted to force the friction-disks and the reel together, and means for pressing such spool into its operating position. The spool is supported in the forked end of a rod G, sustained from the car by a hanger H, said rod being actuated by the driver by means of the lever J, pivoted to a bracket K. The outer faces of the friction-disks are conical, while those which bear against the chain-reel are flat, and the faces in the spool which engage the disks are likewise conical. This spool affords a rolling contact with the friction-disks instead of a rubbing one, and the result is a very limited amount of wear upon the surfaces of the disks and spool, much less than that which would result if the spool were a stationary device instead of a rolling one, and this end is accomplished without any decrease in the efficiency of the grip caused by the friction-disks upon the chain-reel.

The friction-disks and chain-reel I make in separable halves, so they may be applied to the axle of existing cars or be taken off and replaced without any removal of the wheel. The bolts which secure the halves of the reel together are shown at $d$. Each half of the friction-disks is provided with a laterally-extending flange $e$, which flanges, when the halves are assembled upon the shaft, are adapted to fit and surround the shaft and be bolted firmly thereon by the bolts $e'$. The movable disk has attached to one of its flanges $e$ a tongue $e^2$, which sets into a slot $e^3$ in one of the retaining-plates $E^2$, which are bolted to the shaft in a manner similar to the flanges of the friction-disk and are also keyed by key $e^5$, so that they cannot turn independently of the shaft. The tongue-and-slot connection between the movable disk and plate $E^2$ permits the disk to move away from the chain-reel when the spool F is withdrawn from action and also to move toward the reel when the spool is forced against the disk. The disk E' is rigid upon the shaft, as already stated, being keyed thereto by the key $e^4$.

The friction-clutch which I have described above may be used with any ordinary brake in which, when the clutch is thrown into operation, the brake-shoes will be caused to act. I have shown one common form of brake connected to my improved clutch, but I do not wish to be limited thereto. As shown, this brake consists of chains L, each joined at one end to the reels of the clutch mechanisms and each passing around a roller M upon a lever M', pivoted at $m$ to a clip $m'$, attached to the brake-shoe bar M², and from thence around a second pulley N, pivoted to an arm M³, integral with lever M', and from thence to a fixed point O under the platform. Adjacent and parallel to each of the shoe-bars is a supplemental bar P, and these bars are joined together by rods R, the supplemental bars and rods forming a rigid rectangular frame. Each supplemental bar is also pivotally joined to its neighbor lever M' by brackets p.

It will be seen from the construction described that either chain L, when wound upon its reel, will tend to straighten itself and in so doing to swing the lever M', to which it is joined by the rollers M and N. This motion of lever M' is such as to push the adjacent bar P outward and to draw the bar P at the other end of the car against its neighboring shoe-bar and thus to set the brakes at that end. The force put upon the lever M' also carries the shoe-bar upon which it is mounted against the wheels, so that the brake is applied at both ends. The rods R are preferably passed through guides S upon the shoe-bars. The brakes may be operated by hand in the usual manner by turning the shafts T and winding-up chains U, which are joined to the levers M', as shown.

I claim—

1. The combination with the brake mechanism of a car, of a clutch upon the axle consisting of a chain reel loose on the axle, friction disks keyed to the axle, one of them being also free to slide in the line of the axle, a spool engaging the disks, and means for operating said spool, substantially as specified.

2. The combination with the brake mechanism of a car, of a clutch upon the axle consisting of a chain reel loose on the axle, friction disks keyed to the axle, one of them being also free to slide in the line of the axle, a spool engaging the disks, and means for operating said spool, said disks and spool having conical contacting faces, substantially as specified.

3. The combination with the brake mechanism of a car, of a clutch upon the axle consisting of a chain reel loose on the axle, friction disks keyed to the axle, one of them being also free to slide in the line of the axle, a spool engaging the disks, and means for operating said spool, said disks and reel being made in separable halves so they may be applied or removed without removing the wheels, substantially as specified.

4. The combination with the chain reel loose upon the axle of friction disks, one of which is movable along the axle and both of which are keyed to the axle, and a rolling device for forcing said disks against the reel, substantially as specified.

5. The combination with the axle of the chain reel made in halves, the friction disks also made in halves, one of the disks having a tongue $e^2$, and retaining plates $E^2$ one of which is slotted to receive said tongue, substantially as specified.

ENOCH PROUTY.

Witnesses:
H. M. MUNDAY,
J. RICHARDSON.